June 7, 1960 C. J. COBERLY 2,939,533
CASINGLESS, MULTIPLE-TUBING WELL COMPLETING AND PRODUCING SYSTEM
Filed June 20, 1955 7 Sheets-Sheet 2

CLARENCE J. COBERLY,
INVENTOR.
By His Attorneys.
HARRIS, KIECH, FOSTER & HARRIS.

June 7, 1960

C. J. COBERLY

2,939,533

CASINGLESS, MULTIPLE-TUBING WELL COMPLETING AND PRODUCING SYSTEM

Filed June 20, 1955

CLARENCE J. COBERLY,
INVENTOR.

By His Attorneys.

Harris, Kiech, Foster & Harris.

June 7, 1960

C. J. COBERLY 2,939,533

CASINGLESS, MULTIPLE-TUBING WELL COMPLETING AND PRODUCING SYSTEM

Filed June 20, 1955

CLARENCE J. COBERLY,
INVENTOR.

By His Attorneys.
HARRIS, KIECH, FOSTER & HARRIS.

United States Patent Office 2,939,533
Patented June 7, 1960

2,939,533

CASINGLESS, MULTIPLE-TUBING WELL COMPLETING AND PRODUCING SYSTEM

Clarence J. Coberly, San Marino, Calif., assignor to Kobe, Inc., Huntington Park, Calif., a corporation of California Filed June 20, 1955, Ser. No. 516,592

18 Claims. (Cl. 166—68)

The present invention relates in general to completing and producing oil wells, including various operations incidental thereto, and more particularly, to a method of and apparatus for completing and producing oil wells.

To overcome various disadvantages of conventional practice in completing and producing oil wells which will be discussed in detail hereinafter, a primary object of the present invention is to complete and produce a well without any water string or main casing, thereby materially reducing the cost of completing the well by permitting the drilling of a smaller well bore to obtain the same available space in the well, and by eliminating at least a substantial portion of the steel cost represented by the water string.

More particularly, a fundamental object of the invention is to complete and produce an oil well without any main casing or water string by permanently cementing in place in the well a tubing system through which the well is produced. This saves on drilling costs by requiring the well bore to be only large enough to receive the tubing system with the necessary working clearances, and saves most of the steel cost of the main casing through the elimination thereof.

The foregoing objects, advantages, features and results of the present invention, together with numerous other objects, advantages, features and results thereof which will be specifically set forth hereinafter, or which will be apparent to those skilled in the art in the light of the detailed disclosure presented subsequently herein and the claims appearing hereinafter, may be attained with the exemplary embodiments of the invention illustrated in the accompanying drawings, in which:

While the conventional well completing procedure is entirely satisfactory from the standpoint of attaining the results desired, it is subject to at least two serious disadvantages which, as will appear hereinafter, the present invention overcomes. First of all, in order to produce the well, pumping equipment must eventually be used, and to deplete the well, this will have to be placed near the bottom, either in the open hole, or in the liner. The main casing therefore must be larger than the liner and the well bore must be substantially larger than the main casing. Drilling such an enlarged hole adds materially to the cost of drilling the well in that it increases the drilling time, requires larger bits, requires greater mud circulation to remove cuttings, and the like. Secondly, the main casing itself is expensive and adds materially to the cost of completing a well. When larger diameter casing is used, the weight increases faster than the diameter, as the water string is, as the name implies, used to exclude water, and therefore is subject to external pressure tending to collapse the casing, especially when the pressure within the water string is low. In deep wells, casing collapse is an important factor, and casing weight must be selected to withstand this external pressure.

In producing a well by means of a displacement pump, gas which is commonly produced with the oil is conducted to the surface through the water string and discharged into the gas collecting system at the well head. The internal pressure in the water string is the gas pressure, which may initially be high, but which falls as the well is depleted. The hydrostatic head in the production tubing, however, increases as the well is depleted, and therefore the difference between the internal pressure and the external pressure applied to the production tubing approaches the full hydrostatic pressure of the fluid column plus friction. The production tubing must be strong to withstand this internal pressure. Also the production tubing must be suspended from the well head, which causes a high tensile stress in the tubing at the well head. No support is normally given to the production tubing by the well casing, either to resist internal pressure or the tension which is maximum at the well head.

To overcome the disadvantages of conventional practice, the present invention completes and produces a well without any water string or main casing, utilizing only a surface casing, where necessary to protect the underground fresh water supply against contamination, and a liner in the productive zone, where necessary to prevent caving in of the well bore in the productive zone, or the sloughing off of excessive amounts of material from the wall of the well in the productive zone. By doing this, the cost of completing the well is materially reduced, both by permitting the drilling of a smaller well bore to obtain the same available space in the well, and by eliminating at least a substantial portion of the steel cost represented by the water string.

More particularly, the invention completes and produces an oil well without any main casing by permanently cementing in place in the well a tubing system through which the well is produced. This saves on drilling costs by requiring a hole only large enough to receive the tubing system with the necessary working clearances, and eliminates most of the steel cost represented by the main casing by eliminating the main casing. Since, in a cased well, the main casing is utilized to convey gas from the productive formation of the surface, the present invention requires a tubing system incorporating a tubing for the gas. However, this gas tubing may be a small tubing the weight of which is very small as compared to the weight of a main casing. Consequently, by eliminating the main casing, the present invention saves most of the steel weight required by the main casing, which represents a very substantial cost reduction.

Still more particularly, a basic object of the invention is to provide a well completion which involves running a tubing system, including at least two tubings two or more of which are in side-by-side relation, into an uncased well and cementing the tubing system in place in the well above the productive formation. The tubings of the tubing system are thus encased in a body of cement in contact with the exposed or uncased wall of the well so that the tubing system is permanently set in the well. The uncased hole is preferably filled with cement from the top of the productive formation to a level a variable distance thereabove depending upon the structure of the overlying formations around the hole. In other words, the hole may be left open for a substantial portion of its depth above the cemented zone overlying the productive zone if the formations overlying the cemented zone are well consolidated, and if it is not necessary to prevent communication therebetween for some reason. Alternatively, the tubing system may be encased in cement all the way from the top of the productive formation to the bottom of the surface casing, if a surface casing is used, or to the surface of the ground, if no surface casing is used. Thus, the extent to which the hole is filled with cement will depend upon conditions existing in the particular well being completed in accordance with the present invention. Even if it is necessary to fill the hole with cement to, or substantially to, the surface of the ground, the present invention will still provide material savings since cement is much cheaper than steel. As pointed out above, the weight of casing to resist collapse increases rapidly as the diameter is increased. Small tubing, on the other hand, has a high collapse strength and heavy wall tubing is not required. For instance, 2″, 4.6 pounds per foot tubing will have a higher collapse strength than 9⅝″, 60 pounds per foot casing.

Another object is to provide a tubing system which is cemented in place and which, after cementing, is supported to resist tension, collapse and internal pressure.

Another object of the invention is to run into the well a tubing system which carries a cement retainer or basket at the lower end thereof, the cement retainer engaging the wall of the well to prevent cement penetration downwardly into the productive zone.

Another object is to introduce the cement into the zone to be cemented above the basket through one of the tubings of the tubing system, which tubing is subsequently used to produce fluid from the productive zone and, more particularly, to produce gas from the productive zone. In this connection, an object is to provide a tubing in the tubing system which is temporarily closed adjacent its lower end and which is provided above the cement basket with a cement discharge port through which cement pumped into the upper end of such tubing is discharged into the space between the tubing system and the uncased wall of the well, downward flow of the cement being prevented by the retainer. Another object is to provide a cement tubing which may be opened readily after the cementing operation has been completed to permit the use of such tubing for gas production, a related object being to provide a cement tubing closed at its lower end by a plug which may be drilled out after cementing is completed to open the tubing into communication with the productive zone of the well.

With the foregoing procedure, all of the tubings of the tubing system, including at least one tubing for gas production and at least one tubing for liquid production, are run into the well simultaneously along with the cement retainer and the liner, which are carried by the tubing system. Also, all of the tubings of the tubing system are run into the well in tension, which permits running to greater depths.

Another object of the invention is to provide a well completion of the foregoing nature for producing from two zones of the well simultaneously. More particularly, an object is to provide a tubing system part of which runs to an upper productive zone and part of which runs to a lower productive zone, and which carries two vertically spaced cement retainers respectively located adjacent the upper limits of the upper and lower productive zones. Another object is to provide a tubing system which carries liners for the respective zones where required by the characteristics of the producing formations. With this construction, the tubing system may be cemented in above the upper productive zone and that portion of the tubing system which runs to the lower productive zone may be cemented in above the lower productive zone and between the two zones, all in the manner hereinbefore discussed. Of course, it will be understood that the invention may be extended to more than two productive zones if desired.

In accordance with the present invention, the number of tubings in the tubing system may vary, except that the tubing system must include two or more tubings at least two of which are in parallel or side-by-side relation. Because of its versatility, i.e., its susceptibility to a wide variety of production methods, I prefer to utilize a tubing system which includes four tubings in parallel, i.e., side-by-side, the provision of such a tubing system being an important object of the invention. However, other tubing systems including various other numbers of tubings and various other tubing arrangements, may be utilized within the scope of the invention, and among the objects of the invention are to provide tubing systems which consists of two, three, four, or more, tubings at least two of which are in parallel and others of which are either in parallel also, or located within one or more of the parallel tubings.

Another object of the invention is to provide a bottom-hole assembly which includes a tubing system of the foregoing character equipped with a cement retainer and equipped with a liner if required by the character of the productive formation. A related object is to provide such a bottom-hole assembly wherein one of the tubings of the tubing system constitutes the hereinbefore-discussed cement tubing capable of being placed in communication with the productive zone after cementing in of the tubing system.

Another object of the invention is to provide a tubing system which carries, adjacent the lower end thereof, a cement retainer and a liner extending below the cement retainer, the liner being provided with a closure adjacent its upper end and the tubings of the tubing system communicating with the interior of the liner below such closure, except for the temporary closure in the cement tubing.

Another object is to provide a bottom-hole assembly which includes a head having a number of openings therein corresponding to the number of parallel tubings in the tubing system and having thereon the cement retainer and the liner, the openings in the head providing communication between the interior of the liner below the head and the well above the head. Still another object in this connection is to provide a tubing system wherein the cement tubing is connected to the head in communication with one of the openings therethrough, and wherein the other tubing or tubings of the tubing system extend through another opening or openings in the head into the interior of the liner below the head, the number of openings through the head depending on the number of tubings in the tubing system and on the arrangement of the tubings in the tubing system.

Another and important object of the invention is to provide a bottom-hole assembly wherein one of the tubings of the tubing system has connected to the lower end thereof a bottom-hole fitting communicating with the productive formation when the bottom-hole assembly is installed in the well. Other objects in this connection are to provide a bottom-hole assembly wherein the bottom-hole fitting mentioned communicates only with the tubing to which it is connected, or communicates with one or more additional tubings of the tubing system to perform functions hereinafter described.

Another object is to provide a bottom-hole fitting connected to the lower end of one of the tubings of the tubing system which is adapted to receive a standing valve for use in gas-lift production, or production by pumping, from the productive zone of the well.

Still another object is to provide a bottom-hole fitting connected to the lower end of one of the tubings which is adapted to receive equipment for gas-lifting, plunger-lifting, or pumping, fluid from the well. More particularly, an object is to provide a bottom-hole fitting capable of receiving therein a standing valve which provides a seat for a pump insertable into the bottom-hole fitting through the tubing of the tubing system to which the bottom-hole fitting is connected, whereby the pump and the standing valve may be removed for service or repair, the same being true of any gas-lifting or plunger-lifting equipment installed in the bottom-hole fitting. Another object is to provide a bottom-hole fitting which will receive, in addition to gas-lifting and plunger-lifting equipment, pumping equipment of various types, such as a rod pump, for example.

From the foregoing, it will be apparent that a well completion in accordance with the present invention may be utilized to produce the well in various ways, including flowing the well through the tubing system, gas-lifting, plunger-lifting, or pumping, as by a pump of the rod-operated type. An important feature of the invention is to provide a multi-purpose bottom-hole assembly capable of producing the well by any one or a combination of such procedures.

Further in connection with the foregoing, an important object of the invention is to provide a tubing system wherein one or more tubings of the system, in addition to the tubing to which the bottom-hole fitting is connected, communicate with the bottom-hole fitting. With this arrangement, various fluids may be introduced into the bottom-hole fitting from the surface for various purposes. For example, gas may be introduced into the bottom-hole fitting for gas-lift or plunger-lift production. Alternatively, the well fluid may be diluted by introducing a fluid having different characteristics into the bottom-hole fitting from the surface through one of the tubings communicating therewith. The well fluid may be diluted to increase or decrease its viscosity by injecting a fluid of a different viscosity, or heated fluid may be injected into the bottom-hole fitting for admixing with the well fluid to reduce its viscosity if it is normally too viscous for satisfactory production. Additionally, other fluids may be injected through other tubings communicating with the bottom-hole fitting for other purposes. For example, corrosion inhibitors, or emulsion breakers, or the like, may be injected as required by producing conditions.

Another important object of the invention is to provide an apparatus for producing a well through various ones and various numbers of the tubings of the tubing system. More particularly, an object in this connection is to produce a well by flowing fluid from the productive zone, utilizing the pressure present in the productive formation, through various ones and various numbers of the tubings of the tubing system. Still more particularly, an object is to provide means for selectively opening the upper ends of the tubings of the tubing system so as to produce the well by flowing fluid from the productive formation through various ones and various numbers of the tubings, the tubing system preferably including tubings of various sizes. Thus, the present invention permits selecting the tubing combination and/or size which will result in the most efficient gas-lift action with the formation gas produced with the oil, which is an important feature.

Another object of the invention is to provide a tubing system cemented in place in the well which permits the performance of the usual operations incidental to bringing in the well, such as cleaning out or bailing, gun or jet perforating, acidizing, and the like, through one of the tubings of the tubing system, preferably the cement tubing, although one of the other tubings may be used in some instances. Thus, all of the operations normally required to bring the well in, or to treat it to promote production, or to reperforate the liner in the event that the perforations therein become clogged, and the like, may be performed through one or more of the tubings of the tubing system in much the same manner as they are performed in conventional, cased well completions.

From the foregoing general discussion, it will be apparent that the present invention permits performing all the operations normally performed in connection with completing, bringing in and producig a well, but without any necessity for casing the well, all such operations being performed through one or more of the tubings of the tubing system. Thus, the present invention attains all the results of a conventional well completion, with the savings in drilling costs and casing costs hereinbefore discussed, which are important features.

Figures 1, 2:
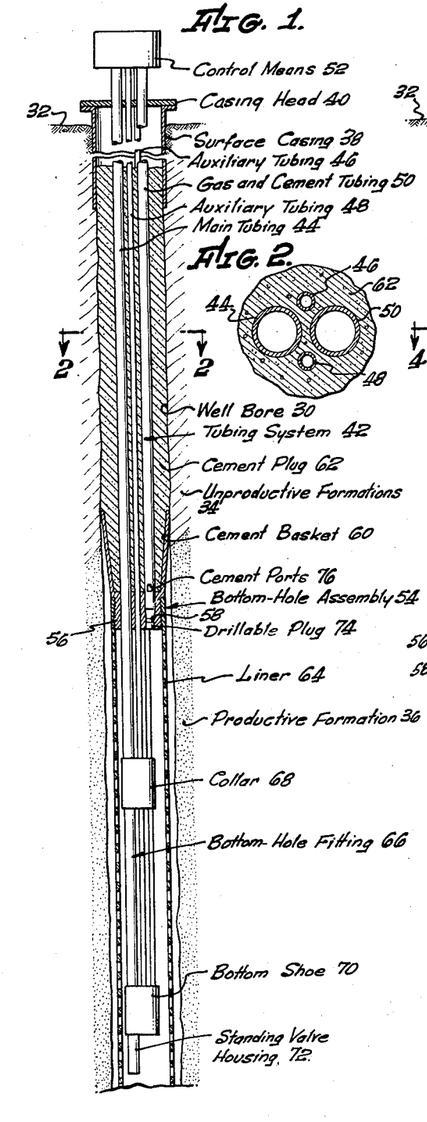
Fig. 1 is a semidiagrammatic, vertical sectional view of a well completion representing the presently preferred embodiment of the invention.
Fig. 2 is a transverse sectional view on an enlarged scale taken along the arrowed line 2—2 of Fig. 1.

For convenience in disclosing the invention, the presently preferred embodiment thereof will be considered first, initially in a general way in connection with Figs. 1 and 2 of the drawings, and then in detail in connection with Figs. 15 to 29 thereof. Thereafter, the embodiments illustrated in Figs. 3 to 14 of the drawings will be considered in sequence by comparing them to the presently preferred embodiment as to structure, mode of operation, method of installation, method of well production, and the like.

Referring particularly to Figs. 1 and 2 of the drawings, the numeral 30 designates a well bore which extends from the surface 32 through unproductive formations 34 into or through a productive formation 36. Set in the upper end of the well bore 30 to protect the underground fresh water strata against contamination is a surface casing 38 which is cemented in place in the usual manner, not shown. This surface casing extends into the well bore 30 a distance sufficient only to protect the fresh water supply, the maximum depth to which surface casing is required ordinarily not exceeding several hundred feet. The remainder of the well bore 30, below the lower end of the surface casing 38, is uncased to leave the wall of the well bore exposed.

Suspended in the well bore 30, as from a casing head 40 at the upper end of the surface casing 38, is a tubing system 42 which, in this embodiment, includes a tubing 44 which will be referred to as a main tubing for convenience, two tubings 46 and 48 which will be referred to as auxiliary tubings for convenience, and a tubing 50 which will be referred to as a gas and cement tubing for reasons which will become apparent. At the upper end of the tubing system 42, above the casing head 40, is a control means 52 to which all of the tubings 44, 46, 48 and 50 are connected, the control means comprising a selector valve means for controlling the flow of fluid through the various tubings as hereinafter discussed in more detail. The control means, or selector valve means, 52 may incorporate any suitable multi-way valve, or multi-way valve system, and will not be described in detail herein.

Carried by the tubing system 42 adjacent the lower end thereof is a bottom-hole assembly 54 including a head 56 through which the various tubings 44, 46, 48 and 50 communicate with the well bore 30 therebeneath in parallel relation. More particularly, the main and auxiliary tubings 44, 46 and 48 extend through and are connected to the head 56, while the gas-cement tubing 50 is connected to the head 56 in communication with a bore 58 therethrough. The bottom-hole assembly 54 also includes an upwardly-directed cement retainer or basket 60 above which is a body or plug 62 of cement, the term "cement" being used broadly herein to include any cementitious material suitable for oil well cementing. The cement plug 62 encases the tubings 44, 46, 48 and 50 and contacts the wall of the well bore 30, the cement plug extending upwardly from the cement basket 60 a distance depending on conditions in a particular well. The cement plug 62 may extend upwardly from the cement basket 60 a relatively short distance if the unproductive formations 34 are well consolidated and if there is no objection to intercommunication between them. Alternatively, the cement plug 62 may extend upwardly into the surface casing 38, as shown. Also, in areas where the surface casing 38 may not be required, the cement plug 62 may extend all the way to the surface 32, if desired or necessary.

The bottom-hole assembly 54 also includes a liner or perforated casing 64 which is suspended from the head 56 carried by the tubing system 42 and which is disposed in the productive zone of the well bore 30, i.e., which is disposed in the well bore in register with the productive formation 36. The liner 64 prevents sloughing off of the productive formation 36 into the well bore 30 if the productive formation is poorly consolidated. In some instances, where the productive formation 36 is well consolidated, the liner 64 may not be necessary.

The bottom-hole assembly 54 also includes a bottom-hole fitting 66 which is connected to the lower end of the main tubing 44 in alignment therewith, the main tubing 44 and the auxiliary tubings 46 and 48 communicating with the bottom-hole fitting 66 as hereinafter described in more detail. The bottom-hole fitting 66 includes a collar 68, a bottom shoe 70, and a housing 72, which may be a standing valve housing, the interior of the bottom-hole fitting 66 communicating with the interior of the liner 64 through the housing 72 as hereinafter described in more detail.

When the well is ready for completion, i.e., after the well bore 30 has been drilled through the unproductive formations 34 into or through the productive formation 36 and it has been established that the productive formation is capable of commercial production, the tubing system 42, with the bottom-hole assembly 54 thereon, is run into the well bore in accordance with the invention, as will now be described in a general way.

First, the bottom-hole assembly 54, including the head 56, the cement basket 60, the liner 64 and the bottom-hole fitting 66, is made up. At this stage, the bore 58 through the head 56 is temporarily closed by means of a removable closure, such as a drillable plug 74, of metal, or other suitable material. Sections of the tubings 44, 46, 48 and 50 are then connected to the bottom-hole assembly 54 as shown, the lowermost section of the gas and cement tubing 50 having cement ports 76 therein just above the cement basket 60.

After the bottom-hole assembly 54 has been made up and sections of the tubings 44, 46, 48 and 50 have been connected thereto in the foregoing manner, the bottom-hole assembly is lowered into the well bore 30. Alternatively, the foregoing structure may be run into the well bore a little at a time as it is made up, if more convenient. In either event, as the bottom-hole assembly 54 is run into the well bore 30, additional sections of the tubings 44, 46, 48 and 50 are connected to the previously-connected sections, this process being continued until the bottom-hole assembly 54 has been run in to the desired location, wherein the liner 64 is in the productive zone, and wherein the cement basket 60 is at or above the top of the productive formation 36.

It will be understood that the sections of the tubings 44, 46, 48 and 50 may be interconnected in various ways, as by means of couplings, or by welding. Welding the tubing sections together is preferable since this eliminates the necessity of upset threaded couplings, which are expensive, welding the tubing sections together thus resulting in substantial savings. The tubing system 42 is run in with a special multiple-slip arrangement, not shown, at the well head which will grip the various tubings independently to insure that each carries its share of the weight of the bottom-hole assembly 54 and of the tubing system therebeneath. Also, special slip-type elevators, not shown, are employed to support the tubings so that the load is properly applied to each tubing when the tubings are carried by the elevators. An important feature which should be mentioned at this point is that by running the tubing system 42 and the bottom-hole assembly 54 in with the tubings 44, 46, 48 and 50 in tension, with each tubing carrying its share of the load, the bottom-hole assembly 54 may be run into a well bore 30 of great depth.

After the tubing system 42, carrying the bottom-hole assembly 54, has been run into the well bore 30 in the foregoing manner, it is then ready to be cemented in place in the well bore, preferably after connecting the tubing system to the casing head 40. Cement is then pumped down the tubing 50 and is discharged through the cement ports 76 into the well bore 30 above the cement basket 60, being prevented from flowing through the bore 58 by the drillable plug 74 therein. The cement basket 60 prevents the downward flow of cement into the productive zone of the well bore 30 and, consequently, the cement introduced into the well bore in the foregoing manner rises upwardly therein above the cement basket to form the cement plug 62 encasing the tubings 44, 46, 48 and 50 and contacting the wall of the well bore. The introduction of cement into the well bore 30 is continued until the top of the cement plug reaches the desired level, which may be a relatively short distance above the cement basket, which may be within the surface casing 38, or which may be at the surface 32, depending on conditions as hereinbefore outlined. The level of the top of the cement plug 62 may be determined with any suitable depth measuring equipment, which may be sonic in principle, for example, or it may be computed by introducing measured amounts of cement.

Figure 29:
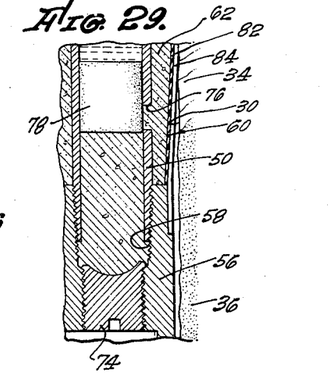

After the well bore 30 has been filled with cement to the desired level above the cement basket 60, the cement and gas tubing 50 is purged of cement before the cement sets. As shown in Fig. 29 of the drawings, the tubing 50 may be purged of cement by running downwardly therein a drillable plug 78, of cement, plastic, metal, or other suitable material. As it is forced downwardly in the tubing 50, the plug 78 forces the cement therebeneath out through the cement ports 76 and thus purges the tubing 50 of cement. The plug 78 may be forced downwardly through the tubing 50 by means of any suitable fluid delivered to the tubing 50 above the plug, drilling mud being convenient for the purpose. After the cement introduced into the well bore 30 in the foregoing manner has set, the cement plug 78, the drillable plug 74, and any cement trapped therebetween, are drilled out with a suitable drill inserted through the tubing 50, thereby opening this tubing into communication with the productive zone below the head 56. As will be discussed in more detail hereinafter, the tubing 50 may then be used to produce fluid, preferably gas, from the productive zone, the cement externally of the tubing 50 effectively sealing the cement ports 76.

Figure 15:
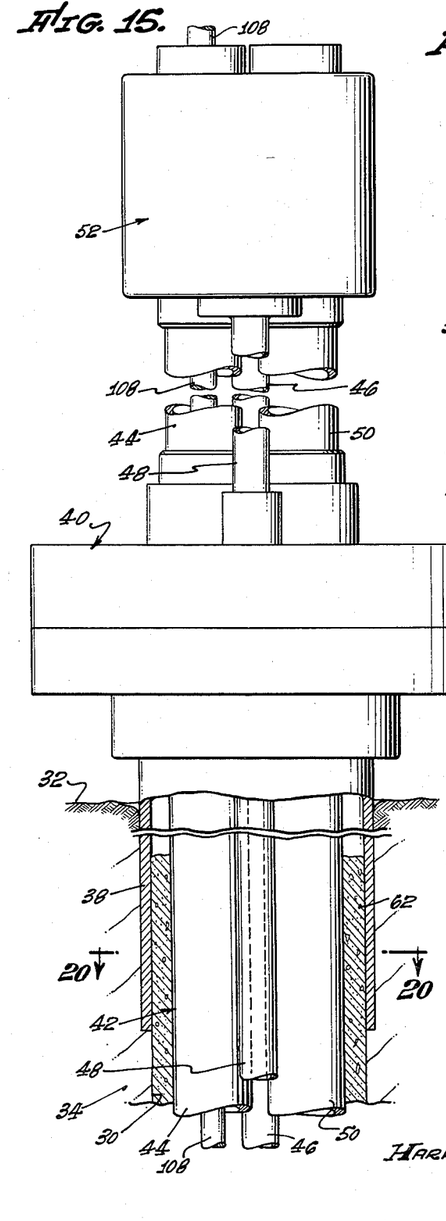
Fig. 15 is an enlarged view illustrating in more detail the upper end of the presently preferred embodiment of Fig. 1 of the drawings, the upper end of Fig. 15 being in elevation and the lower end thereof being in vertical section.
Figure 16:
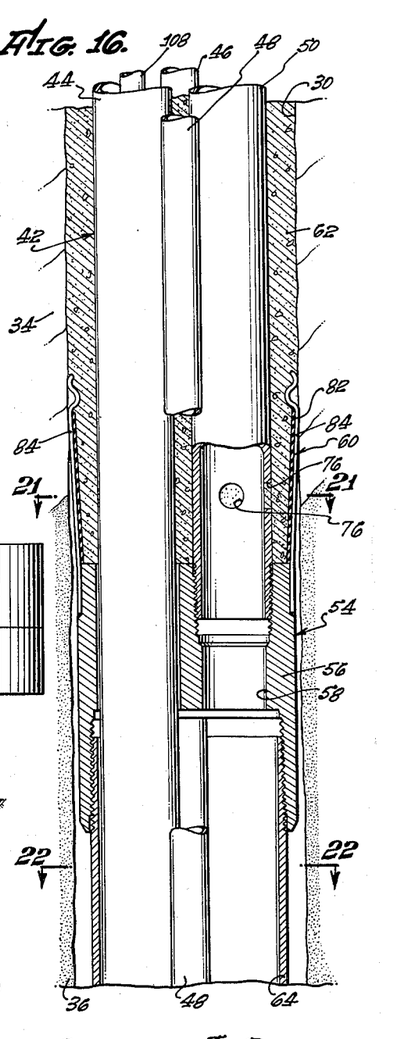
Figs. 16, 17, 18 and 19 are fragmentary, vertical sectional views which are downward continuations of Figs. 15, 16, 17 and 18, respectively, Figs. 17, 18 and 19 being taken along the correspondingly labeled arrowed line of Fig. 22.

Considering the structure of the presently-preferred well-completion embodiment of the invention now in more detail with reference to Figs. 15 to 29 of the drawings, the cement basket 60, shown in Fig. 16, may be of any conventional construction. As shown, the cement basket includes a frusto-conical apron 82 of rubberized fabric, or similar material, supported by spring fingers 84 welded, or otherwise secured, to the upper end of the head 56 at their lower ends and engaging the wall of the well bore 30 at their upper ends. As will be apparent, as soon as a small amount of cement is introduced into the apron 82 through the cement ports 76, the weight of the cement causes the apron 82 and the spring fingers 84 to spread outwardly into cement-tight engagement with the wall of the well bore 30.

Continuing to refer to Fig. 16, the lower end of the gas and cement tubing 50 is threaded into the bore 58 through the head 56. The tubings 44, 46 and 48 extend through the head 56 and are suitably connected thereto so that the tubing system supports the weight of the bottom-hole assembly 54, as hereinbefore discussed. In the particular construction shown, the tubings 44, 46 and 48 merely extend through parallel openings in the head and are secured thereto. However, it will be understood that upper and lower sections of the tubings 44, 46 and 48 may be threaded into the upper and lower ends, respectively, of the corresponding openings through the head, if desired. The liner 64 is suspended from the head 56 by threading the upper end of the liner into the lower end of the head in the particular construction illustrated, the tubes 44, 46 and 48 extending downwardly within the liner.

Figure 17:
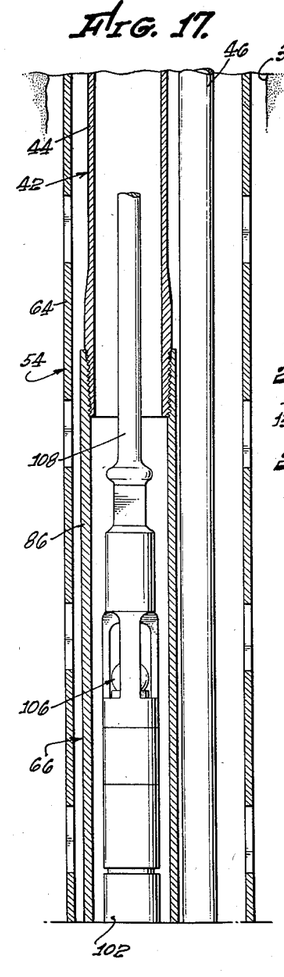
Figure 18:
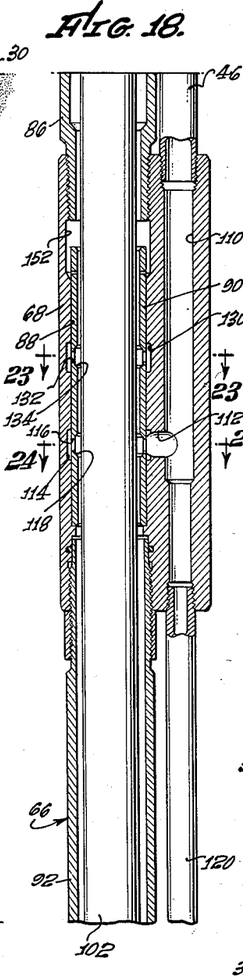
Figure 19:
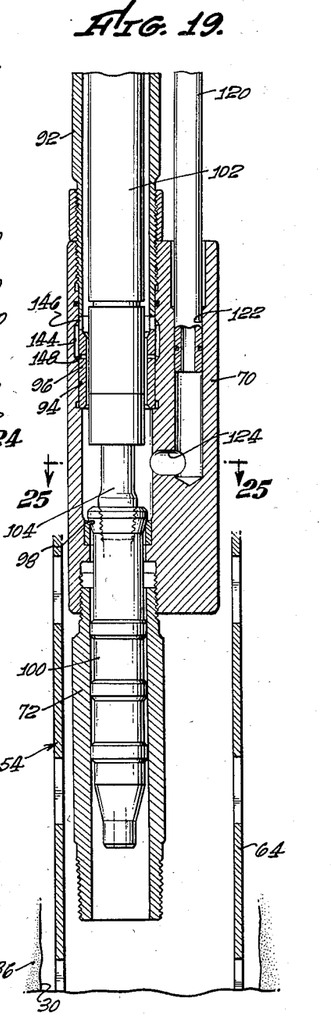
Figure 23:
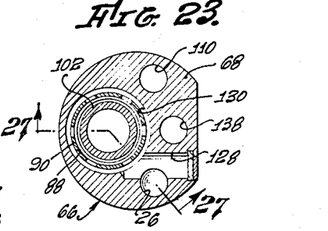
Figs. 23 and 24 are transverse sectional views respectively taken along the arrowed lines 23—23 and 24—24 of Fig. 18.
Figure 24:
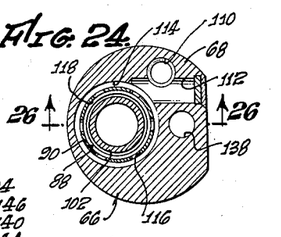
Figure 25:
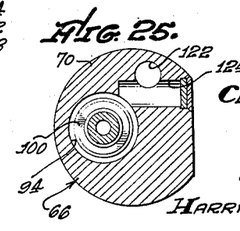
Fig. 25 is a transverse sectional view taken along the arrowed line 25—25 of Fig. 19.

Referring now to Fig. 17 of the drawings, the lower end of the main tubing 44 is threadedly connected to the upper end of a tube 86 which forms part of the bottom-hole fitting 66. The lower end of the tube 86 is threadedly connected to the upper end of the collar 68 in communication with a main bore 88 through the collar, this main bore having a sleeve 90 pressed thereinto. As shown in Figs. 18 and 19, the bottom-hole fitting 66 also includes a pump housing tube 92 which is threadedly connected to the collar 68 in communication with the main bore 88 therethrough, and which is threadedly connected at its lower end to the upper end of the bottom shoe 70 in communication with a main bore 94 therein, this main bore having a sleeve 96 pressed thereinto.

Within the collar 70 adjacent the lower end thereof and in communication with the main bore 94 is a seat 98 for an element 100 which may be a standing valve or standing valve assembly and which depends into the housing 72, the latter being connected to the lower end of the bottom shoe. The housing 72 serves as an intake through which well fluid may be admitted into the bottom-hole fitting 66.

As will be discussed in considerably more detail hereinafter, the standing valve, or other element, 100 may be utilized in conjunction with producing the well with various artificial-lifting devices. For example, the standing valve 100 may be utilized in conjunction with pumps of various types, such as a rod pump 102. As shown in Fig. 19 of the drawings, the rod pump 102, which may be of any suitable construction, is provided with an inlet 104 which is connected to the standing valve 100 and which communicates with the productive zone of the well through the standing valve. Alternatively, the element 100 may be a cup-type hold down for the rod pump 102 and the latter may be provided with its own standing valve. The pump 102 is provided adjacent its upper end with an outlet 106 for production fluid discharged thereby, this production fluid being discharged into the tube 86 connected to the lower end of the main tubing 44. The pump 102 is operated by a sucker rod 108 which extends upwardly through the main tubing 44 to the surface, as shown in Figs. 15, 16, and 17. The sucker rod 108 extends through the control means 52 for connection to suitable surface equipment for reciprocating the sucker rod, as is well known in the art.

Continuing to consider the particular bottom-hole fitting 66 shown, the auxiliary tubing 46, as shown in Fig. 18 of the drawings, is threadedly connected at its lower end to the upper end of the collar 68 in communication with a passage 110 through the collar. This passage communicates with the interior of the sleeve 90 in the collar 68 through a port 112 in the collar, an annular channel 114 in the collar, and ports 116 and an annular channel 118 in the sleeve. Threadedly connected to the lower end of the collar 68 in communication with the passage 110 therethrough is a tube 120 which communicates at its lower end with a passage 122, Fig. 19, in the bottom shoe 70. Fluid communication between the passage 122 and the main bore 94 in the bottom shoe 70 is established by a port 124 in the bottom shoe below the sleeve 96 therein.

Figure 26:
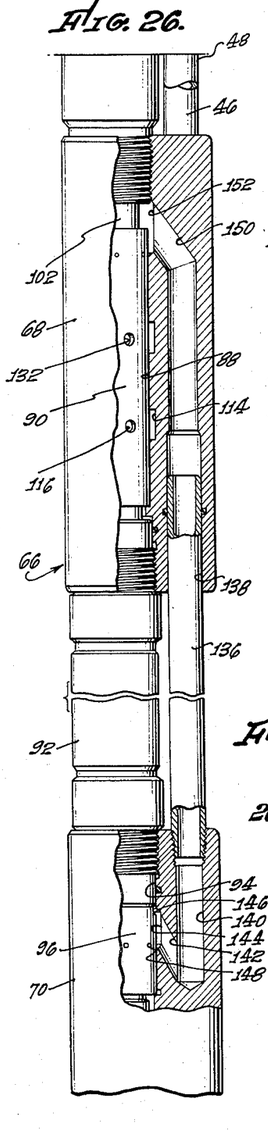
Figs. 26 and 27 are fragmentary vertical sectional views respectively taken along the arrowed lines 26—26 and 27—27 of Figs. 24 and 23, respectively, Figs. 26 and 27 being taken at approximately the same level as Fig. 18.
Figure 27:
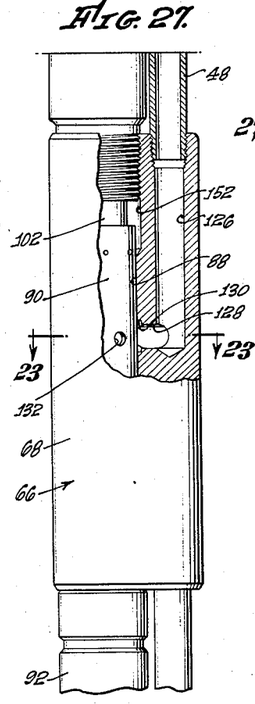
Figure 28:
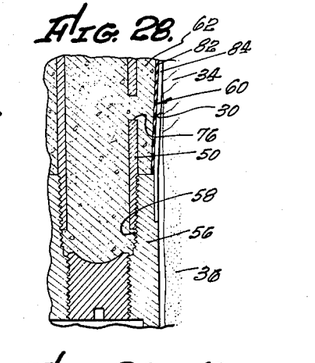
Figs. 28 and 29 are fragmentary vertical sectional views taken at the lower end of a cement tubing of the invention, Fig. 28 illustrating the cementing in of the tubing system of the invention through the cement tubing and Fig. 29 illustrating the purging of the cement tubing of cement.

Still considering the bottom-hole fitting 66, the lower end of the auxiliary tubing 48, as shown in Fig. 27 of the drawings, is threadedly connected to the upper end of the collar 68 in communication with a passage 126 in the collar. This passage communicates with the interior of the sleeve 90 in the collar 68 through a port 128 and an internal annular channel 130 in the collar and through radial ports 132 and an internal annular channel 134, Fig. 18, in the sleeve 90. As shown in Fig. 26 of the drawings, a tube 136 is connected to the collar 68 and the bottom shoe 70 in communication with passages 138 and 140 therein to by-pass the pump-housing tube 92 between the collar and the bottom shoe. More particularly, the passage 140 communicates with a port 142 in the bottom shoe 70, which port communicates with an internal annular channel 144 in the bottom shoe. This channel communicates with the interior of the sleeve 96 in the bottom shoe through ports 146 and 148 through the sleeve 96. The passage 138 in the collar 68 communicates with the main bore 88 in the collar above the sleeve 90 in such main bore through a port 150 and an internal annular channel 152 in the collar. Thus, fluid communication is established between the interior of the sleeve 96 in the bottom shoe 70 and the main bore 88 in the collar 68 above the sleeve 90 therein.

With the well completion illustrated in Figs. 1, 2 and 15 to 29 and hereinbefore described in detail, a wide variety of production methods may be employed, which is an important feature of the invention. Some of these production methods will be considered in subsequent paragraphs.

First of all, fluid from the productive formation 36 may be produced by flowing the well, utilizing the pressure naturally present in the producing formation. Of course, for production by flowing, the standing valve, or other element, 100 and the rod pump 102 would be removed. In producing the well by flowing, fluid from the productive zone enters the tubings 44, 46 and 48 through the bottom-hole fitting 66 by way of the passages, ports, and the like, hereinbefore described. Gas or oil may also be produced through the tubing 50, although this tubing may be closed by the control means 52 to apply maximum pressure to the bottom of the producing zone. The control means 52 is also set to open that one, or that combination of, the tubings 44, 46 and 48 which will utilize most efficiently the gas pressure naturally present in the productive formation, which is an important feature of the invention.

Considering how the tubings 44, 46 and 48 may be utilized selectively to attain maximum production efficiency by flowing, it must be kept in mind that, in the natural flow of an oil well, the flow may occur either because the bottom hole pressure is greater than the hydrostatic pressure of the liquid column or columns, or, more frequently, because the liquid contains gas in solution, or free gas mixed with the liquid, to decrease the density of the column or columns. In other words, the gas in solution and the free gas lighten the liquid column or columns, and when the total column pressure of this gas-liquid mixture is less than the bottom hole pressure, the mixture will flow to the surface. In this type of flow, much of the gas slips through the liquid, and it is therefore an inefficient method of lifting the oil to the surface as conventionally practiced. The amount of slippage depends upon the velocity in the tubing, being less when the velocity in high. On the other hand, high velocity increases the friction loss in the tubing. Consequently, for each set of conditions, there is an optimum tubing size. The present invention, by providing a plurality of tubings of different sizes, as shown in the drawings, provides a marked increase in efficiency over that attainable in accordance with prior practice, by making available means for varying the flow rate and tubing size to obtain maximum efficiency under a wide variety of conditions. Also, the present invention is flexible over a wide range, and by properly selecting that one, or that combination of, the tubings 44, 46 and 48 which will produce most efficiently the natural flowing period of the well can be materially extended. For example, for maximum flow, all of the tubings are used in parallel. For minimum flow, only one of the auxiliary tubings 46 and 48 is used. For intermediate flows, any combination of tubings may be selected to obtain maximum efficiency. Thus, for production by flowing, the present invention provides extreme versatility to permit flowing the well at maximum efficiency, whereby the flowing life of the well may be materially extended.

Considering another way of producing the well with the present invention, high pressure gas lifting may be utilized when the relation between gas volume, liquid volume and bottom hole pressure no longer permits natural flow. With this procedure, gas may be added from the surface through any one of the tubings of the tubing system 42. This lightens the fluid columns and extends the flow to a lower bottom hole pressure. By the use of multiple tubings, one or more may be used for gas injection and the remainder for flowing the well. The combination selected will be that which will give the minimum bottom hole pressure at the maximum flow rate desired, or any desired rate less than maximum.

Still another way of producing the well with the present invention is by low pressure gas lifting, which will now be considered. Ultimately, the formation pressure will fall off to such an extent that the bottom hole pressure required for producing the well by flowing at a reasonable rate may exceed the formation pressure so that no fluid can enter the well bore from the formation. In this case, a booster pump, not shown, of any suitable type may be installed in the bottom-hole fitting 66, together with the standing valve 100. For example, the rod pump 102 could be used as such a booster pump. In this situation, the function of the booster pump is to force fluid from the well into the bottom-hole fitting 66 at a pressure equal to the desired gas lift pressure, the gas required for production by gas lifting being injected through one or more of the tubings 44, 46 and 48, the tubing 50 being closed.

Alternatively, the well may be produced by gas lifting without a booster pump, it being necessary under such conditions to produce the well intermittently. For this type of production, the standing valve 100 is installed in the bottom hole fitting 66, and gas is injected into the bottom hole fitting through one or more of the tubings 44, 46 and 48 intermittently to permit well fluid to enter the bottom hole fitting between the periods of gas injection. The amount of liquid discharged during each gas-injection period is only the amount which will accumulate above the standing valve 100 between gas-injection periods. The intermittent gas injection may be accomplished by means of an intermitter, not shown, installed in the bottom-hole fitting 66 along with the standing valve 100, such intermitters being well known. Alternatively, the intermittent gas injection may be controlled from the surface, as by an intermitter incorporated in the control means 52. The use of an intermitter at the bottom of the well in the bottom-hole fitting 66 is preferable since pressure is maintained on the gas supply tubing or tubings at all times, whereas with an intermitter located at the surface, it is necessary to bleed the pressure in the gas-injection tubing or tubings to zero after each slug of fluid is discharged before additional fluid can enter the bottom-hole fitting 66 from the well.

In producing the well by gas lifting, in order to reduce slippage of the gas through the liquid, a plunger lift, not shown, may be installed in the bottom-hole fitting 66 along with the standing valve 100, plunger lifts being well known. With a plunger lift, the operation is similar to that hereinbefore described, except that a plunger is provided in the pump housing tube 92 to prevent the gas from by-passing the slug of fluid which is in the tubing 44, as is well known in the art. In this case, the gas injection control may also be either at the surface, or at the bottom of the well in the bottom-hole fitting 66.

It will be understood that with the foregoing gas lifting and plunger lifting procedures, the fluid is preferably produced through the larger, main tubing 44, with gas being injected through one or both of the auxiliary tubings 46 and 48, which are smaller than the main tubing. Also, under the foregoing conditions, the tubing 50 will be shut off by the control means 52 at the surface.

Another way of producing a well completed in accordance with the present invention is by pumping, as by means of the rod pump 102 hereinbefore described. The fluid discharged by the pump 102 may flow to the surface through any or all of the tubings 44, 46 and 48, and gas may be driven off through the tubing 50. Also, as hereinbefore indicated, the pump 102 may be used as a booster pump in connection with production by gas lifting, in which case gas may be injected into the bottom-hole fitting 66, preferably through one or both of the auxiliary tubings 46 and 48, the tubing 50 being shut off under such conditions.

Also, a hydraulic pump, such as is shown and described in my Patent No. 2,589,671, may be substituted for the rod pump 102 if desired, together with a suitable standing valve, the bottom-hole fitting 66 being capable of receiving same.

Another way in which the well may be produced in conjunction with rod pumping in particular involves utilizing one or more of the tubings 44, 46 and 48, preferably one or both of the tubings 46 and 48, to inject fluids other than, or in addition to, gas. For example, one or both of the tubings 46 and 48 may be utilized to inject a fluid for changing the viscosity of the well fluid. In handling extremely heavy crudes, it is frequently desirable to inject a low viscosity oil to lighten the heavy crude, and this is readily accomplished with the present invention by injecting a light oil through one or both of the tubings 46 and 48 for mixing with the heavy crude. Alternatively, the crude may be so light that it is desirable to inject a heavier crude to reduce slippage of the light crude past the plunger of the pump 102. Also, in dealing with heavy crudes in particular, the viscosity of such crudes may be decreased by injecting heated fluids, such as hot oil, through one or both of the auxiliary tubings 46 and 48. Furthermore, one or both of the tubings 46 and 48 may be utilized for injecting other materials, such as corrosion inhibitors, or emulsion breakers, into bottom-hole fitting 66 for mixing with the well fluid. By having the auxiliary tubings 46 and 48 available, it is possible to apply one or more chemicals simultaneously and continually, which is an important advantage. In addition to the foregoing, various other substances or materials may be injected into the bottom-hole fitting 66 through one or both of the auxiliary tubings 46 and 48 for mixing with the well fluid to change its characteristics in any desired manner, which is an important feature of the invention.

Thus, it will be apparent that the present invention, by providing a multiple tubing system, is extremely versatile in that it is capable of production by flowing, gas lifting and pumping, or various combinations of these, and with or without injection or other materials for various purposes. Consequently, even though the tubing system 42 is permanently cemented in place, the well can be produced in any of the ways conventionally employed, and can be produced more efficiently and effectively than with conventional well completions because of the multiple tubings. Thus, with the embodiment of Figs. 1, 2 and 15 to 29 in particular, having the tubing system permanently cemented in place is no handicap with respect to producing the well.

Also, even though the tubing system 42 is permanently cemented in place, all of the operations normally required to complete and bring in a well may be performed through the tubing system. For example, bailing operations may be performed through either the tubing 44, or the tubing 50. To clean out the liner 64, the bailer should be run in through the tubing 50. In wells having considerable bottom hole pressure, a bailer tube may be used with a valve at the lower end which may be opened by impact upon hitting bottom either in the tubing, the liner 64, or on sand or other obstruction in either. This procedure will very effectively clean out both the tubings 44 and 50 and the liner 64.

In the event that the perforations in the liner 64 turn out to be too small, or become permanently clogged, the liner may be reperforated by lowering perforating equipment through the tube 50, means being provided so as to orient the perforating equipment in such a manner that it will perforate the liner without damaging the bottom-hole fitting 66.

If it is desired to acidize the productive formation 36, this may be done through the tubing 50 in the usual manner. The tubings 44, 46 and 48 may be protected against the entry of acid during the acidizing treatment by installing a removable plug at the lower end of the bottom-hole fitting 66 and then pressurizing the tubings 44, 46 and 48. This plug may then be removed in any suitable manner.

The various tubings of the tubing system 42 may be cleaned in place by acidizing with an inhibited acid, followed by a suitable neutralizer. Also, tubing brushes may be run in through the tubings to remove scale, wax, or other material, the tubing brushes being followed with swab cups for carrying loosened material to the surface. Equipment of this nature may be run into the tubings in any suitable manner, as on wire lines, for example.

If, after the tubing system 42 is set in the well bore 30 and cemented in place, it is found that burs, internal dimensional errors, or tubing damage, prevent a normal size pump or tool from running to the bottom freely, the tubing may be broached to remove such obstructions. This may be done by running in progressively larger broaches, the material removed by any one broach being limited by its diameter. For example, the broach size may be increased by increments of 0.002 inch to 0.005 inch until the nominal tubing size is reached. Cuttings are then removed by swabbing or bailing as hereinbefore described.

As discussed earlier herein, since the tubings of the tubing system 42 are permanently installed, the sections thereof may be welded together, instead of being coupled together, as the tubing system is run in, thereby eliminating the expensive upset threaded couplings. Broaches located in the tubings below the weld points could be pulled upwardly after welding to shear off internal flashes from the welds. Another feature of welding the tubing sections together is that, by eliminating large couplings, a further reduction in hole size is possible, which is an important cost factor.

Turning now to the embodiments illustrated in Figs. 3 to 14 of the drawings, these embodiments are, for the most part, quite similar to the presently preferred embodiment hereinbefore described and illustrated in Figs. 1, 2 and 15 to 29 of the drawings. Consequently, corresponding reference numerals will be utilized for corresponding components insofar as possible, and the embodiments of Figs. 3 to 14 will be discussed largely on a comparative basis, pointing out differences over the presently preferred embodiment.

Figures 3, 4:
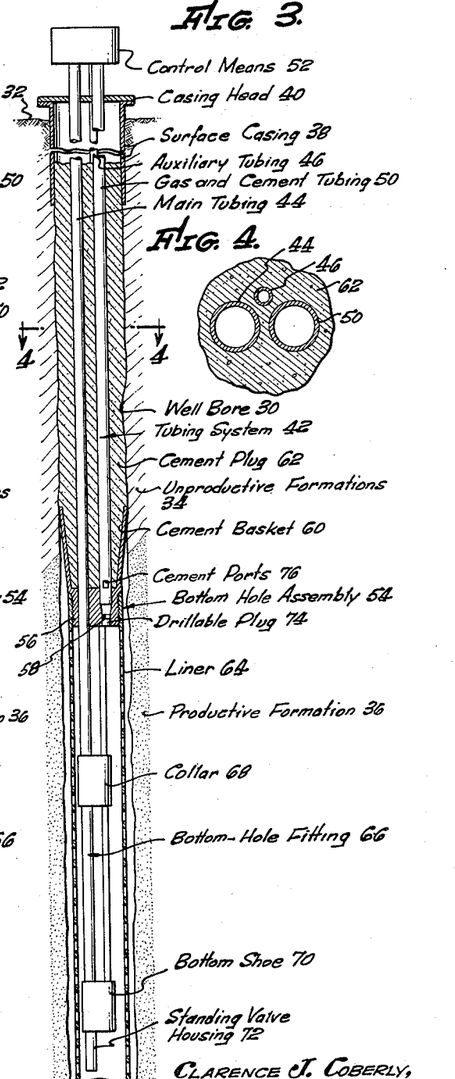
Figs. 3, 5, 7, 9, 11 and 13 are semidiagrammatic, vertical sectional views which are similar to Fig. 1, but which respectively illustrate other embodiments of the invention, Fig. 13 illustrating a two-zone well completion of the invention.
Figs. 4, 6, 8, 10, 12 and 14 are enlarged, transverse sectional views respectively taken along the arrowed lines 4—4, 6—6, 8—8, 10—10, 12—12 and 14—14 of Figs. 3, 5, 7, 9, 11 and 13, respectively.

Considering first the embodiment of Figs. 3 and 4, this embodiment differs from that of Figs. 1 and 2 in that the tubing system 42 includes three parallel tubings 44, 46 and 50, the tubing 48 being omitted. The foregoing is the principal difference, other differences being present in the bottom-hole fitting 66 to accommodate the reduced number of tubings connected thereto. This embodiment can be utilized to produce the well in all the ways hereinbefore discussed in connection with the embodiment of Figs. 1 and 2 of the drawings.

Figures 5, 6:
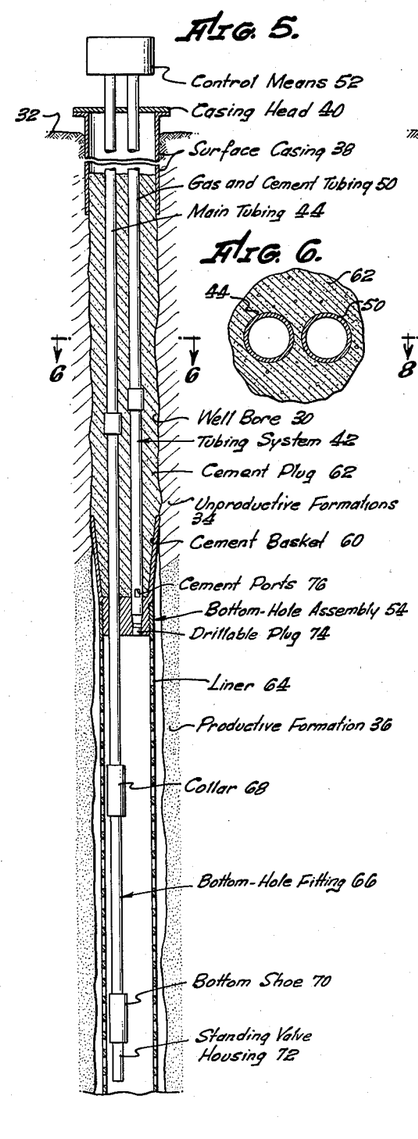

The embodiment of Figs. 5 and 6 of the drawings includes a tubing system 42 having only two tubings 44 and 50, the auxiliary tubings 46 and 48 being omitted. The bottom-hole fitting 66 communicates only with the main tubing 44. This embodiment can be used in all the ways hereinbefore described, including rod pumping, natural flowing, gas lifting and plunger lifting, the gas required for gas lifting and plunger lifting being introduced through the tubing 50. This tubing may also be utilized for injecting other materials or substances, as hereinbefore discussed.

Figures 7, 8:
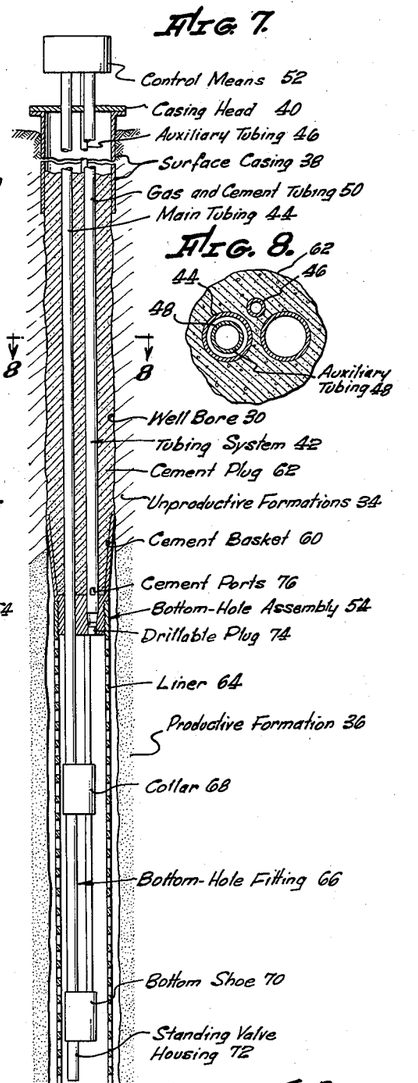

The embodiment illustrated in Figs. 7 and 8 of the drawings is similar to that illustrated in Figs. 1 and 2, the principal difference being that the auxiliary tubing 48 is larger and is disposed concentrically within the main tubing 44. A modified bottom-hole fitting 66 is necessary for this arrangement. The embodiment of Figs. 7 and 8 may be utilized to perform all the functions hereinbefore described in connection with the embodiment of Figs. 1 and 2, one advantage of the embodiment presently under consideration being that the maximum stress in the tubing 48 is reduced somewhat, since it carries none of the weight of the bottom-hole assembly 54, so that it can carry greater pressures to the same depth, or higher pressures to greater depths, as compared with the embodiment of Figs. 1 and 2. Another advantage is that the tubing 48 in this concentric arrangement may be removed for repair or replacement if this is ever necessary.

Figures 9, 10, 11, 12:
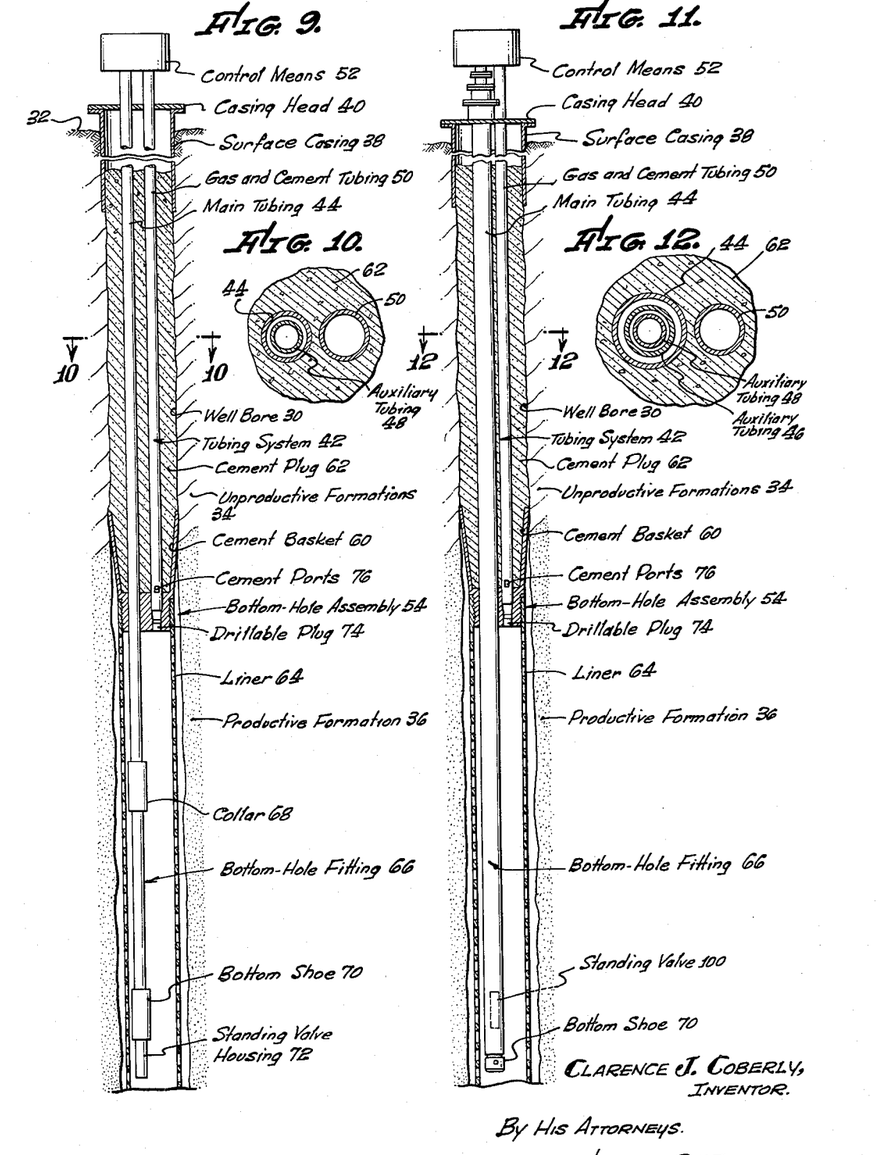

The embodiment of Figs. 9 and 10 of the drawings differs from that of Figs. 1 and 2 in that the auxiliary tubing 46 is omitted and the auxiliary tubing 48 is somewhat larger and is disposed within the main tubing 44, the bottom-hole fitting 66 communicating only with the tubings 44 and 48. This embodiment, considered from a different point of view, is quite similar to that of Figs. 3 and 4, except that the auxiliary tubing is disposed within the main tubing 44, instead of in parallel. The functions hereinbefore discussed can be performed by this embodiment. This embodiment also has the advantages hereinbefore attributed to a concentric tubing in connection with the embodiment of Figs. 7 and 8 of the drawings.

The embodiment of Figs. 11 and 12 is basically the same as that of Figs. 1 and 2 and is capable of performing the same functions, the main difference being that the main tubing 44 is enlarged substantially and the auxiliary tubing 46 and 48 are concentrically disposed within the main tubing 44 with the auxiliary tubing 48 within the auxiliary tubing 46, the bottom-hole fitting 66 being modified to accommodate this concentric arrangement. This system has the same advantages as that of Figs. 3 and 4 and has the additional advantage that it provides a four-tubing system wherein two of the tubings may be removed for repair or replacement.

It might be pointed out that the embodiments of Figs. 9 and 10 and Figs. 11 and 12 may be converted to that of Figs. 5 and 6 by removing the inner tubings. Similarly, the embodiment of Figs. 7 and 8 can be converted to that of Fig. 3 by removing the inner tubing 48.

Figures 13, 14, 20, 21, 22:
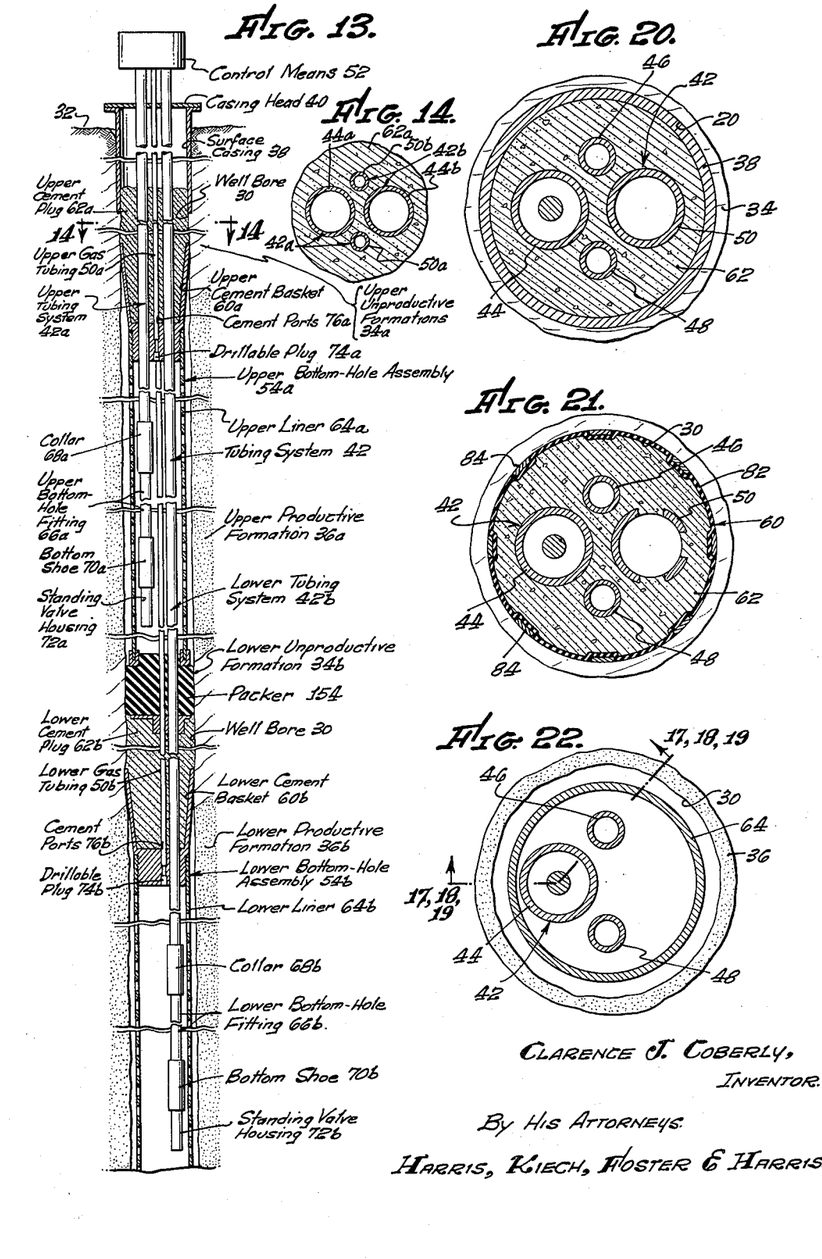
Fig. 20 is transverse sectional view taken along the arrowed line 20—20 of Fig. 15.
Figs. 21 and 22 are transverse sectional views respectively taken along the arrowed lines 21—21 and 22—22 of Fig. 16.

In Figs. 13 and 14 of the drawings is shown an adaptation of the embodiment of Figs. 1 and 2 to two-zone production, any of the other four-tubing systems hereinbefore disclosed also being adaptable to two-zone production in a generally similar way. For convenience in considering this embodiment, the same reference numerals will be employed for corresponding components, except that the suffix "a" will be applied to the reference numerals for those elements which relate to the upper zone and the suffix "b" will be applied to the reference numerals for those elements which relate to the lower zone.

Thus, the embodiment of Figs. 13 and 14 comprises a tubing system 42 which includes a system 42a supporting a bottom-hole assembly 54a for the upper productive formation 36a, and includes a tubing system 42b supporting a bottom-hole assembly 54b for the lower productive formation 36b, the tubing system 42a including a main tubing 44a and a gas and cement tubing 50a, and the tubing system 42b including a main tubing 44b and a gas and cement tubing 50b. The upper and lower bottom-hole fittings 66a and 66b are connected only to the main tubings 44a and 44b, respectively, these bottom-hole fittings being similar to the bottom-hole fitting 66 of the embodiment of Figs. 5 and 6. The upper bottom-hole assembly 54a includes its cement basket 60a and liner 64a, while the lower bottom-hole assembly 54b includes its cement basket 60b and liner 64b. Both tubing systems 42a and 42b are cemented in above the upper cement basket 60a by an upper cement plug 62a, while the lower tubing system 42b is cemented in above the lower cement basket 60b by a lower cement plug 62b. The cement plugs 62a and 62b are formed by pumping cement downwardly through the tubings 50a and 50b, respectively, and discharging the cement through cement ports 76a and 76b therein. The level to which the cement forming the lower cement plug 62b rises in the well bore 30 may be limited by introducing a metered amount of cement, or, as shown, it may be limited by means of a packer 154 carried by the lower tubing system 42b. By making the upper bottom-hole assembly 54a slidable on the lower tubing system 42b, so that the two bottom-hole assemblies are independently supported by their respective tubing systems, the packer 154 may be compressed, as shown, into engagement with the wall of the well bore 30 by the weight of the upper bottom-hole assembly 54a, which is a convenient way of setting the packer 154. It will be apparent that the upward rise of cement above the lower cement basket 60b may be limited in other ways also. Further, while two separate liners 64a and 64b have been shown, it will be understood that one continuous liner may be utilized, with or without an intermediate imperforate section in register with the lower unproductive formation 34b. As will be apparent, the embodiment of Figs. 13 and 14 may be operated to produce each zone in the same manner as the embodiment of Figs. 5 and 6.

While various exemplary embodiments of the present invention have been disclosed herein for purposes of illustration, it will be understood that various changes, modifications and substitutions may be incorporated in such embodiments and that various other applications of the invention may be practiced, all without departing from the spirit of the invention as defined by the claims allowed to me and appearing hereinafter.

I claim as my invention:

1. An installation for producing a well drilled from the surface into a productive formation, including: a tubing system extending downwardly in the well from the surface to the productive formation and including two side-by-side tubings; a perforated liner in the well at the level of the productive formation and connected to the lower end of said tubing system, at least one of said tubings communicating with the interior of said liner; a cement retainer in the well adjacent the upper end of said liner; and cement filling the space between the wall of the well and said tubing system and extending upwardly from said cement retainer.

2. In a producing installation for a well drilled from the surface into a productive formation, the combination of: a tubing system set in the well and extending downwardly from the surface to the productive formation, said tubing system including at least two tubings at least two of which are side-by-side, said tubing system being cemented in place in the well above the productive formation; and a perforated liner in the well at the level of the productive formation and connected to the lower end of said tubing system, at least one of said tubings communicating with the interior of said liner.

3. A producing installation as defined in claim 2 wherein said tubing system consists of two tubings.

4. A producing installation as defined in claim 2 wherein said tubing system consists of three tubings.

5. A producing installation as defined in claim 2 wherein said tubing system consists of three tubings, all side-by-side.

6. A producing installation as defined in claim 2 wherein said tubing system consists of three tubings, one of which is concentrically located within another thereof.

7. A producing installation as defined in claim 2 wherein said tubing system consists of four tubings.

8. A producing installation as defined in claim 2 wherein said tubing system consists of four tubings, all side-by-side.

9. A producing installation as defined in claim 2 wherein said tubing system consists of four tubings, one of which is concentrically disposed within another thereof.

10. A producing installation as defined in claim 2 wherein said tubing system consists of four tubings, one of which is concentrically disposed within a second which, in turn, is concentrically disposed within a third.

11. In a producing installation for a well drilled from the surface into a productive formation, the combination of: a tubing system extending downwardly in the well from the surface to the productive formation and cemented in place in the well above the productive formation, said tubing system including at least two tubings at least two of which are side-by-side; a perforated liner in the well at the level of the productive formation and connected to the lower end of said tubing assembly; and a standing valve at the lower end of one of said tubings and communicating with said one tubing and the interior of said liner.

12. A well completion, including: a tubing system set in a well which is drilled from the surface into a productive formation and which is uncased at the level of the productive formation and above the productive formation throughout at least a substantial portion of the distance between the productive formation and the surface so that the wall of the well is exposed, said tubing system extending downwardly in the well from the surface to the productive formation and including at least two tubings at least two of which are side-by-side; a body of cement in the well above the productive formation and in the space between the tubing system and the wall of the well to cement the tubing system in place in the well, the body of cement surrounding the tubing system and contacting the uncased, exposed wall of the well; and means for producing fluid from the productive formation through one or more of said tubings.

13. A well completion according to claim 12 including a perforated liner in the well at the level of the productive formation and connected to the lower end of said tubing system, the tubing of said tubing system through which fluid from the productive formation is produced communicating with the interior of said liner.

14. A well completion as defined in claim 12 including a cement retainer connected to said tubing system at the lower end of said body of cement and above the productive formation, one of said tubings having an opening above said retainer which is closed by said body of cement, and at least one of said tubings having an opening below said retainer and communicating with the productive formation.

15. A well completion according to claim 12 wherein said producing means includes pumping means in the well and having an inlet communicating with the productive formation below said body of cement and an outlet communicating with one of said tubings.

16. A well completion as defined in claim 12 including a bottom-hole pump housing connected to the lower end of one of said tubings below said body of cement, said producing means including a pump in said pump housing and having an inlet communicating with the productive formation below said body of cement and an outlet communicating with the said tubing to which said pump housing is connected.

17. A well completion as set forth in claim 16 in which said pump is a fluid-operated pump and wherein said tubing system includes a third tubing extending downwardly from the surface and communicating with said pump housing to permit the introduction of fluid under pressure for operating said pump into said pump housing.

18. A well completion according to claim 16 including a standing valve in said pump housing, said pump being seated on said standing valve and said inlet of said pump communicating with the productive formation below said body of cement through said standing valve.

References Cited in the file of this patent

UNITED STATES PATENTS

| | | |
|---|---|---|
| 171,563 | Hardison | Dec. 28, 1875 |
| 1,067,868 | Dunn | July 22, 1913 |
| 1,511,067 | Russell | Oct. 7, 1924 |
| 2,319,702 | Moon | May 18, 1943 |
| 2,335,355 | Penick et al. | Nov. 30, 1943 |
| 2,335,387 | Cantin | Nov. 30, 1943 |
| 2,351,322 | Crake | June 13, 1944 |
| 2,357,145 | Sandefer | Aug. 29, 1944 |
| 2,366,547 | Oak | Jan. 2, 1945 |
| 2,368,428 | Saurenman | Jan. 30, 1945 |
| 2,605,637 | Rhoades | Aug. 5, 1952 |
| 2,652,000 | Woolsey | Sept. 15, 1953 |
| 2,767,792 | Spearow | Oct. 23, 1956 |
| 2,780,291 | Westling | Feb. 5, 1957 |
| 2,785,753 | Spearow | Mar. 19, 1957 |

UNITED STATES PATENT OFFICE

CERTIFICATE OF CORRECTION

Patent No. 2,939,533　　　　　　　　　　　　　　June 7, 1960

Clarence J. Coberly

It is hereby certified that error appears in the printed specification of the above numbered patent requiring correction and that the said Letters Patent should read as corrected below.

Column 1, line 70, after "is" insert -- a --; column 3, line 12, for "of" read -- to --; column 6, line 35, for "producig" read -- producing --; column 11, line 15, for "in high" read -- is high --; column 12, line 39, for "driven" read -- drawn --.

Signed and sealed this 8th day of November 1960.

(SEAL)
Attest:

KARL H. AXLINE
Attesting Officer

ROBERT C. WATSON
Commissioner of Patents